United States Patent [19]

Finke et al.

[11] Patent Number: 5,015,680

[45] Date of Patent: May 14, 1991

[54] PRODUCTION OF A THERMOPLASTICALLY PROCESSABLE, AROMATIC POLYAMIDE USING A 4-PHENOXYPYRIDINE STABILIZER

[75] Inventors: Jürgen Finke; Roland Feinauer, both of Marl; Martin Bartmann, Recklinghausen, all of Fed. Rep. of Germany

[73] Assignee: Huels Aktiengesellschaft, Marl, Fed. Rep. of Germany

[21] Appl. No.: 472,916

[22] Filed: Jan. 31, 1990

[30] Foreign Application Priority Data

Feb. 25, 1989 [DE] Fed. Rep. of Germany ....... 3905883

[51] Int. Cl.$^5$ ..................... C08K 5/343.2; C08K 5/51; C08K 5/52; C08G 69/28

[52] U.S. Cl. ..................................... 524/99; 524/153; 524/414; 524/710; 524/718; 528/336; 528/337; 528/341; 528/348

[58] Field of Search ............... 528/336, 337, 341, 348; 524/99, 153, 414, 710, 718

[56] References Cited

U.S. PATENT DOCUMENTS

| | | | |
|---|---|---|---|
| 3,531,423 | 9/1970 | Stokes et al. | 524/720 |
| 3,703,493 | 11/1972 | Holub | 524/719 |
| 4,720,538 | 1/1988 | Bartmann | 528/336 |
| 4,749,768 | 6/1988 | Finke et al. | 528/336 |

*Primary Examiner*—Kriellion Morgan
*Attorney, Agent, or Firm*—Millen, White & Zelano

[57] ABSTRACT

An aromatic polyamide, e.g., from isophthalic acid and 4,4′-bis(4-aminophenoxy)diphenylsulfone, is produced with a sufficient amount, e.g., 0.05–4 mol%, of 4-phenoxypyridine to improve resistance to thermal oxidation.

12 Claims, No Drawings

PRODUCTION OF A THERMOPLASTICALLY PROCESSABLE, AROMATIC POLYAMIDE USING A 4-PHENOXYPYRIDINE STABILIZER

CROSS REFERENCE TO RELATED APPLICATIONS

This application is related to copending, coassigned application entitled Production of Aromatic Polyamides with High Purity Monomers [Attorney's Docket No. HUELS 732] and copending, coassigned application entitled Production of Aromatic Polyamides with Fused Ring Stabilizer [Attorney's Docket No. HUELS 733].

BACKGROUND OF THE INVENTION

The invention relates to a process for the production of thermoplastically processable, aromatic polyamides, resultant compositions and articles of manufacture made therefrom.

Conventional polyamides are produced by the polycondensation of the starting monomers set forth below:

(A) HOOC—Ar—COOH
(B) $H_2N$—Ar'—$NH_2$ with the following meanings:

Ar: 1,3- or 1,4-phenylene; 1,4-,1,5-, 2,6- or 2,7-naphthylene,

AR':

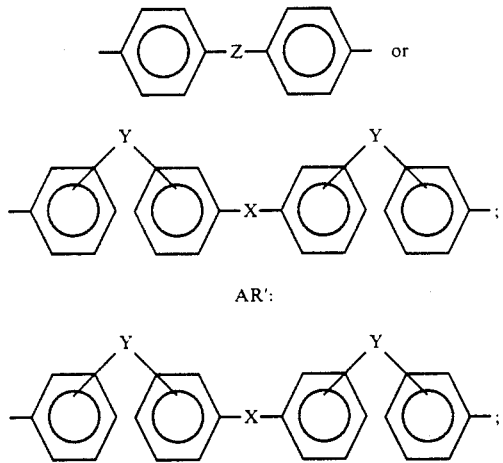

X: —$SO_2$—; —CO—;
Y: —O—; —S—;
Z: —O—; —S—; —$SO_2$—; —CO—; —$CR_2$—; or a single bond;
R: —H; $C_1$—$C_4$—alkyl;

in the melt in the presence of 0.05-4 mol %, based on the sum total of components (A) and (B), of a phosphorus-derived acid of the general formula $H_3PO_n$ wherein n=2 to 4, or triphenyl phosphite, at temperatures in the range of 200° to 400° C.

The production of such polyamides is basically known (DOS 3,609,011). Because the melt viscosity of these aromatic polyamides is high, even higher temperatures are required during their manufacture and processing, generally at least 350° C. At these temperatures, damage to the product is frequently observed, recognizable by discolorations or an impairment of the mechanical properties.

SUMMARY OF THE INVENTION

An object of the invention is to provide molding compositions based on aromatic polyamides which do not exhibit the aforedescribed disadvantages of the prior art products.

Another object is to provide a process for producing the polyamides for such compositions.

Still another object is to provide articles of manufacture produced from such molding compositions.

Upon further study of the specification and appended claims, further objects and advantages of this invention will become apparent to those skilled in the art.

These objects are attained by performing the polycondensation reaction in the presence of a sufficient amount of 4-phenoxypyridine to stabilize the resultant polyamides against thermal oxidation, generally 0.05-4 mol % of 4-phenoxypyridine, based on the sum total of components (A) and (B).

Preferably, 4-phenoxypyridine is utilized in amounts of 0.2-2 mol %, based on the total mols of components (A) and (B).

For the production of the aromatic polyamides, suitable aromatic dicarboxylic acids (component A) include but are not limited to isophthalic acid, terephthalic acid, 1,4-, 1,5-, 2,6-, 2,7-naphthalenedicarboxylic acid, 4,4'-diphenyl ether dicarboxylic acid or 4,4'-benzophenonedicarboxylic acid, 4,4'-diphenylsulfonedicarboxylic acid, 2-phenoxyterephthalic acid or mixtures thereof.

Likewise, suitable aromatic diamines (component B) include but are not limited to, for example, 4,4'-bis(4-aminophenoxy)diphenylsulfone, 4,4'-bis(3-aminophenoxy)-diphenylsulfone, 4,4'-bis(4-aminophenoxy)-benzophenone, 4,4'-bis(3-aminophenoxy)benzophenone, 4,4'-bis(p-aminophenylmercapto)diphenylsulfone or mixtures thereof.

The preferred components are (A) isophthalic acid and (B) 4,4'-bis(4-aminophenoxy)diphenylsulfone.

The molar ratio in which components (A) and (B) are used ranges at about 1:1.

In order to achieve an improvement in the hydrolysis resistance of the polyamides, it is optional to add to the products of this invention 0.01-10 mol %, based on the sum total mols of components (A) and (B), of a low-molecular aliphatic, araliphatic or aromatic carboxylic acid amide. In this context, the aromatic residue can be substituted by halogen or by $C_1$- to $C_4$-alkyl residues. This advantage has been disclosed in DOS 3,804,401.

Preferred aliphatic carboxylic acid amides are acetic acid N-ethylamide, butyric acid N-ethylamide, butyric acid N-decylamide, or propionic acid N-octylamide; preferred araliphatic carboxylic acid amides are benzoic acid N-butylamide, toluic acid N-butylamide, and butyric acid N-phenylamide; and preferred aromatic carboxylic acid amides are benzanilide, 4-chlorobenzoic acid anilide, tolyl-anilide, benzoic acid N-(4,4'-phenoxy)diphenylsulfonamide, and 2-naphthalenecarboxylic acid anilide.

It is also possible, moreover, to prepare the low-molecular weight carboxylic acid amides with the aid of amide-forming compounds in the reaction mixture proper, i.e., in situ. In this case, amide-forming compounds, such as aromatic monocarboxylic acids, e.g., benzoic acid, naphthalenecarboxylic acid or chlorobenzoic acid, and/or aliphatic monocarboxylic acids of 1-20 carbon atoms, are made to react with aromatic monoamines, for example, aniline, chloroaniline, naphthylamine, 4-(4-aminophenoxy)diphenylsulfone, and/or aliphatic amines of 4-20 carbon atoms. The carboxylic acid and amine are preferably used in equimolar amounts.

The glass transition temperatures ($T_g$) of the polyamides according to this invention are in the range of about 190°-270° C. and the viscosity numbers (J values) are about 30-100 cc/g, preferably 60-80 cc/g. (J values are also known as intrinsic viscosities, limiting viscosity numbers, and the Staudinger index, Rompper 8th edition, Vol. 6, p. 4532).

As indicated above, the production of the aromatic polyamides is basically conventional and described, inter alia, in DOS 3,609,011, i.e., by the polycondensation of components (A) and (B) in the presence of aphosphorus-derived acid of the general formula $H_3PO_n$ wherein n=2 to 4 inclusive, or triphenyl phosphite.

Suitable acids derived from phosphorus are hypophosphorous acid, phosphorous acid, phosphoric acid.

The catalyst is utilized in catalytic quantities, generally in amounts of 0.05-4 mol %, preferably 0.02-2 mol %, based on the sum total of components (A) and (B). The catalyst and 4-phenoxypyridine are preferably utilized in equimolar amounts.

The reaction is performed in the melt at temperatures ranging from about 200° to 400° C., preferably 230°-360° C., and conventionally carried out under an inert gas and under normal pressure. However, superatmospheric pressure or a vacuum can likewise be used.

In order to increase molecular weight, the aromatic polyamides can be subjected to solid-phase recondensation in an inert gas atmosphere.

The polyamides can be processed by means of conventional machines into molding compositions which can also additionally contain fillers, such as talc, or reinforcing media, such as glass fibers, aramid fibers, or carbon fibers, as well as other usual additives, such as, for example, pigments and/or stabilizers.

The molding compositions are processed into molded parts, fibers, films, etc., in accordance with conventional methods, such as injection molding, extrusion, or similar processes. Use as a coating agent is likewise possible, starting with powder (e.g., fluidized bed coating method), a liquid dispersion, or a solution.

Aromatic polyamides produced in accordance with the process of this invention exhibit an unexpectedly high temperature stability. Processing of the products can take place even at temperatures of above 340° C. without the occurrence of a drop in molecular weight or brown discoloration. Furthermore, molding compositions obtained according to the invention show excellent stability with respect to thermal oxidation so that they can be utilized even at markedly higher temperatures than corresponding prior art compositions.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 39 05 883.2, are hereby incorporated by reference.

The glass transition point ($T_g$) referred to in this specification was determined with the use of a differential scanning calorimeter (DSC) at a heating rate of 10° C./min.

The viscosity numbers (J) referred to in this specification were determined by using 0.5% by weight solutions of the polymers in a phenol/o-dichlorobenzene mixture (1:1 part by weight) at 25° C. in accordance with DIN 53 728.

Examples identified by letters are not in accordance with this invention.

The 4-phenoxypyridine is a well known compound, per se, and is produced, e.g., by reacting 4-chloropyridine with sodium phenolate.

EXAMPLES

Example 1

A melt was prepared from 21.62 g (0.05 mol) of 4,4'-bis(4-aminophenoxy)diphenylsulfone and 8.31 g (0.05 mol) of isophthalic acid with 155 mg (0.0005 mol) of triphenyl phosphite and 85.5 mg (0.0005 mol) of 4-phenoxypyridine in a polycondensation reactor equipped with agitator, nitrogen inlet and distillation bridge at 250° C. The temperature was raised to 300° C. after 20 minutes. During this step, the viscosity of the melt was constantly on an increase while the water liberated during the course of the reaction was removed by distillation. After 30 minutes at 300° C., the reaction was stopped.

The viscosity number (J) was 38 cc/g. A solid-phase recondensation at 250° C. and 0.5 mbar yielded a polyamide with J=63 cc/g after 24 hours.

Example 2

21.62 g (0.05 mol) of 4,4'-bis(4-aminophenoxy)-diphenylsulfone, 6.64 g (0.04 mol) of isophthalic acid and 1.66 g (0.01 mol) of terephthalic acid were reacted with 81 mg (0.001 mol) of $H_3PO_3$ and 171 mg (0.001 mol) of 4-phenoxypyridine analogously to Example 1.

The viscosity number was 45 cc/g after 30 minutes at 300° C. The solid-phase recondensation conducted analogously to Example 1 yielded a polyamide with J=74 cc/g.

Example 3

21.62 g (0.05 mol) of 4,4'-bis(4-aminophenoxy)-diphenylsulfone and 8.31 g (0.05 mol) of isophthalic acid were reacted analogously to Example 1 with 109 μl (0.001 mol) of 50% by weight aqueous hypophosphorous acid and 171 mg (0.001 mol) of 4-phenoxypyridine.

The viscosity number (J) was 43 cc/g. The solid-phase recondensation conducted analogously to Example 1 yielded a polyamide with J=75 cc/g.

Example A (DOS 3,609,001)

21.62 g (0.05 mol) of 4,4'-bis(4-aminophenoxy)-diphenylsulfone, 8.31 g (0.05 mol) of isophthalic acid and 109 μl (0.001 mol) of 50% aqueous hypophosphorous acid were reacted analogously to Example 1.

The viscosity number (J) was 32 cc/g. A solid-phase recondensation conducted analogously to Example 1 yielded a polyamide with J=62 cc/g.

Example B (DOS 3,609,011)

21.62 g (0.05 mol) of 4,4'-bis(4-aminophenoxy)-diphenylsulfone and 8.31 g (0.05 mol) of isophthalic acid were reacted with 109 μl (0.001 mol) of 50% by weight aqueous hypophosphorous acid and 122 mg (0.001 mol) of 4-dimethylaminopyridine analogously to Example 1.

The viscosity number (J) of the polyamide was 35 cc/g. After a solid-phase recondensation conducted analogously to Example 1, a polyamide was obtained with J=75 cc/g.

The polyamides produced in Examples 1 to 3, as well as in the comparative examples were compression-molded into panels having a thickness of 1 mm at 310° C. and under a pressure of 100 bar, and stored in a recirculating air oven with a fresh air feed of about 10 vol % for 24 hours at 200° C. The polyamides produced in accordance with the state of the art showed a very strong dark-brown discoloration whereas the polyamides produced in accordance with this invention exhibited no change in color.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing a thermoplastically processable, aromatic polyamide by polycondensation of the following starting monomers:
   (A) HOOC—Ar—COOH
   (B) $H_2N$—Ar'—$NH_2$
   wherein
   Ar is 1,3- or 1,4-phenylene, 1,4-, 1,5-, 2,6- or 2,7-naphthylene, t,110
   X is —$SO_2$— or —CO—;
   Y is —O— or —S—;
   Z is —O—; —S—; —$SO_2$—; —CO— or —$CR_2$— or a single bond;
   R is —H or $C_1$—$C_4$—alkyl;
   in the melt in the presence of 0.05–4 mol %, based on the total mols of components (A) and (B), of an acid of the formula $H_3PO_n$ wherein n is 2 to 4 inclusive, or triphenyl phosphite, at a temperature of about 200°–400° C., and performing the polycondensation reaction in the presence of 0.05–4 mol %, based on the total mols of components (A) and (B), of 4-phenoxypyridine.

2. A process according to claim 1, wherein the 4-phenoxypyridine is contained in the reaction mixture in an amount of 0.2–2 mol %, based on the total mols of components (A) and (B).

3. A process according to claim 1, wherein the 4-phenoxypyridine is contained in the reaction mixture in about equimolar quantities, based on the phosphorus compound.

4. A composition produced by the process of claim 1.

5. An article of manufacture made by molding a molding composition comprising the composition according to claim 4.

6. A composition produced by the process of claim 2.

7. A composition produced by the process of claim 3.

8. An article of manufacture made by molding a molding composition comprising the composition according to claim 6.

9. An article of manufacture made by molding a molding composition comprising the composition according to claim 7.

10. A melt-polymerized aromatic polyamide produced with a sufficient amount of 4-phenoxypyridine in the melt to improve resistance to thermal oxidation.

11. An article of manufacture made by molding a molding composition comprising the composition according to claim 10.

12. A method of improving resistance to thermal oxidation of a melt-polymerized aromatic polyamide, comprising adding a sufficient amount of 4-phenoxypyridine to the melt to improve resistance to thermal oxidation.

* * * * *